United States Patent [19]

Guillot et al.

[11] Patent Number: 5,522,228
[45] Date of Patent: Jun. 4, 1996

[54] PRODUCTION OF COLD BY ADSORPTION/DESORPTION OF CARBON DIOXIDE

[75] Inventors: André Guillot, Saleilles; Alain Marty; Patrice Pelletier, both of Perpignan; Bernard Spinner, Corneilla del Vercol; Philippe Boye, Sete, all of France

[73] Assignee: Manufactures de Vetements Paul Boye S.A., Sete, France

[21] Appl. No.: 281,643

[22] Filed: Jul. 28, 1994

[30] Foreign Application Priority Data

Jul. 29, 1993 [FR] France .................. 93 09348

[51] Int. Cl.$^6$ ............. F25B 15/00; F25B 17/08
[52] U.S. Cl. ................. 62/101; 62/112; 62/480
[58] Field of Search ................ 62/101, 112, 480

[56] References Cited

U.S. PATENT DOCUMENTS

| | | | |
|---|---|---|---|
| 4,413,479 | 11/1983 | Rojey ........................... | 62/101 |
| 4,433,554 | 2/1984 | Rojey et al. ................... | 62/112 |
| 4,448,031 | 5/1984 | Rojey et al. ................... | 62/101 |
| 4,548,046 | 10/1985 | Brandon et al. ................ | 62/480 X |
| 4,709,558 | 12/1987 | Matsushita et al. ............. | 62/480 |
| 4,784,217 | 11/1988 | Payre et al. ................... | 62/112 X |
| 4,972,676 | 11/1990 | Sakai ........................... | 62/114 X |
| 5,237,827 | 8/1993 | Tchernev ....................... | 62/480 X |
| 5,310,593 | 5/1994 | Tsujimoto et al. .............. | 428/166 |
| 5,339,649 | 8/1994 | Kawai et al. ................... | 62/480 X |
| 5,384,101 | 1/1995 | Rockenfeller .................. | 62/112 X |
| 5,388,637 | 2/1995 | Jones et al. ................... | 62/480 X |

FOREIGN PATENT DOCUMENTS

| | | |
|---|---|---|
| 0523849 | 11/1993 | European Pat. Off. . |
| 2526926 | 3/1983 | France . |
| 2509846 | 5/1983 | France . |

OTHER PUBLICATIONS

Chemical Abstracts, vol. 109, No. 14, Mar. 10, 1988, Abstract No. 113100v, Tokunaga, Nobuyuki et al.
Chemical Abstracts, vol. 84, No. 4, Jan. 26, 1976 Abstract No. 22524k, Ermolenko, I. N. et al.
Derwent abstracts of French patents French Search Report.

*Primary Examiner*—Christopher Kilner
*Attorney, Agent, or Firm*—Wigman, Cohen, Leitner & Myers

[57] ABSTRACT

The invention relates especially to a process for the production of cold, comprising at least one stage of adsorption of carbon dioxide by an adsorbent solid substance and at least one stage of desorption of the carbon dioxide adsorbed in the said adsorbent substance, in which the said adsorbent substance comprises activated carbon fibers or an active charcoal and has a specific surface of at least 700 m$^2$/g and an external specific surface of at least 0.005 m$^2$/g.

8 Claims, 14 Drawing Sheets

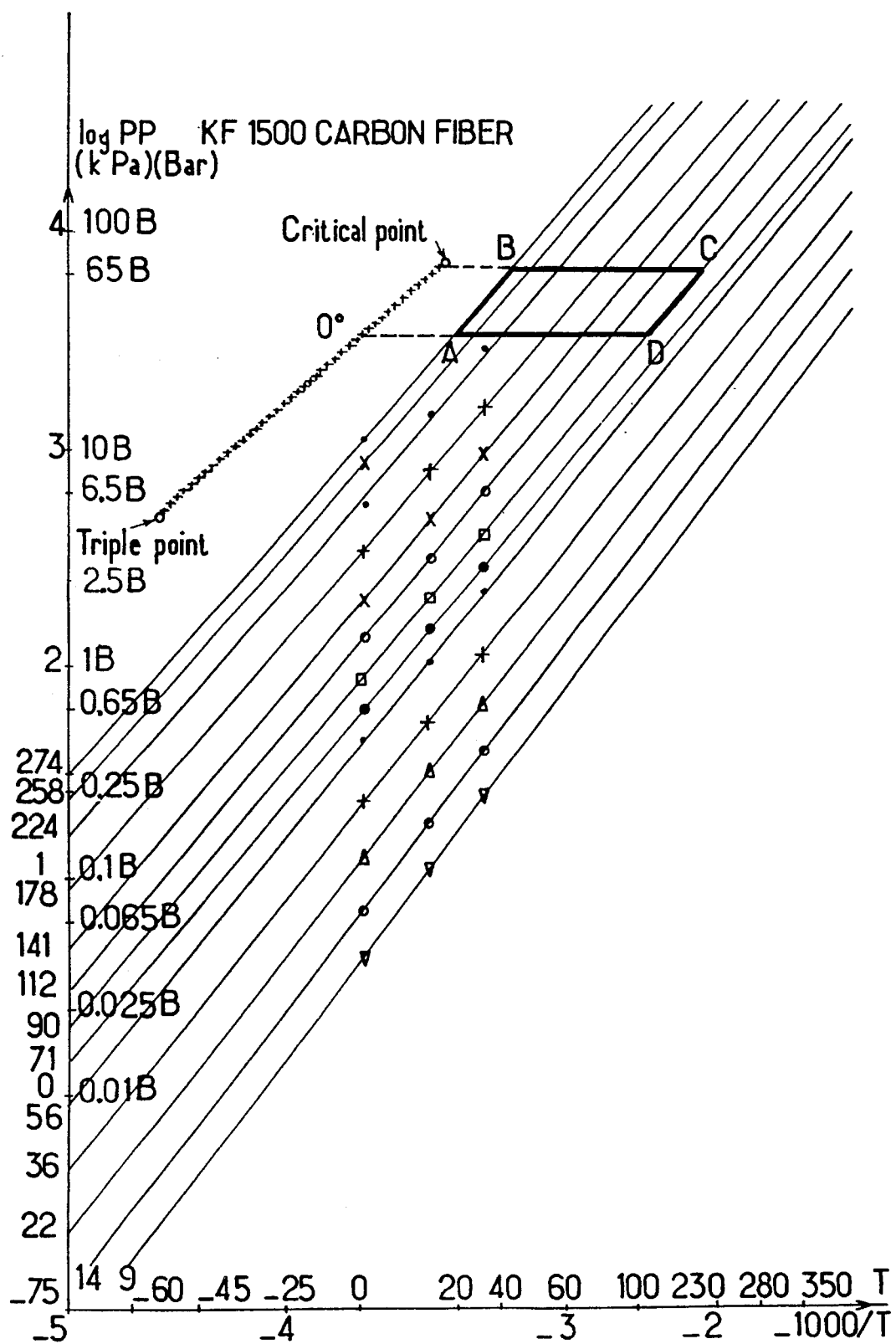
FIG.: 1

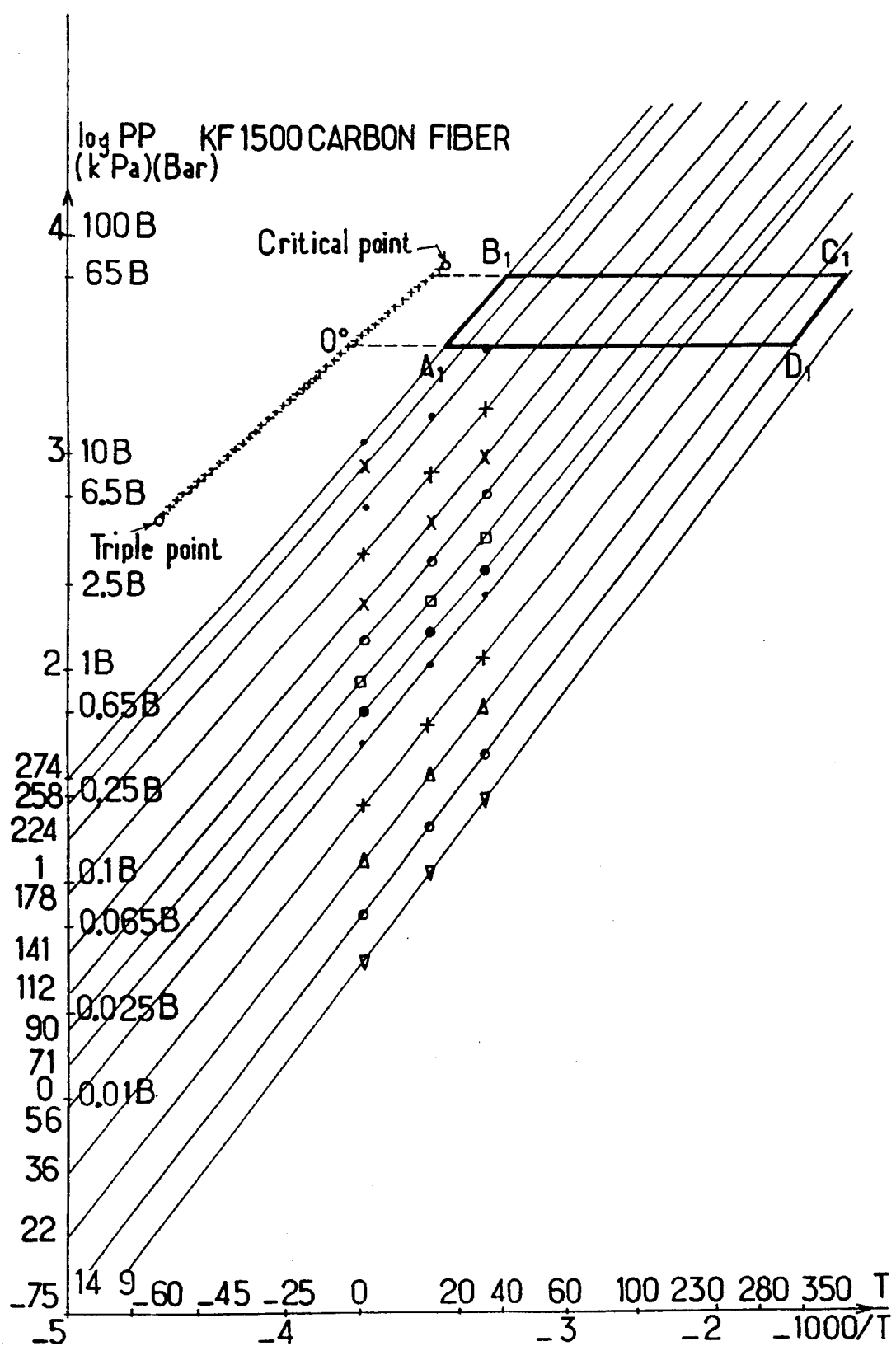
FIG.: 2

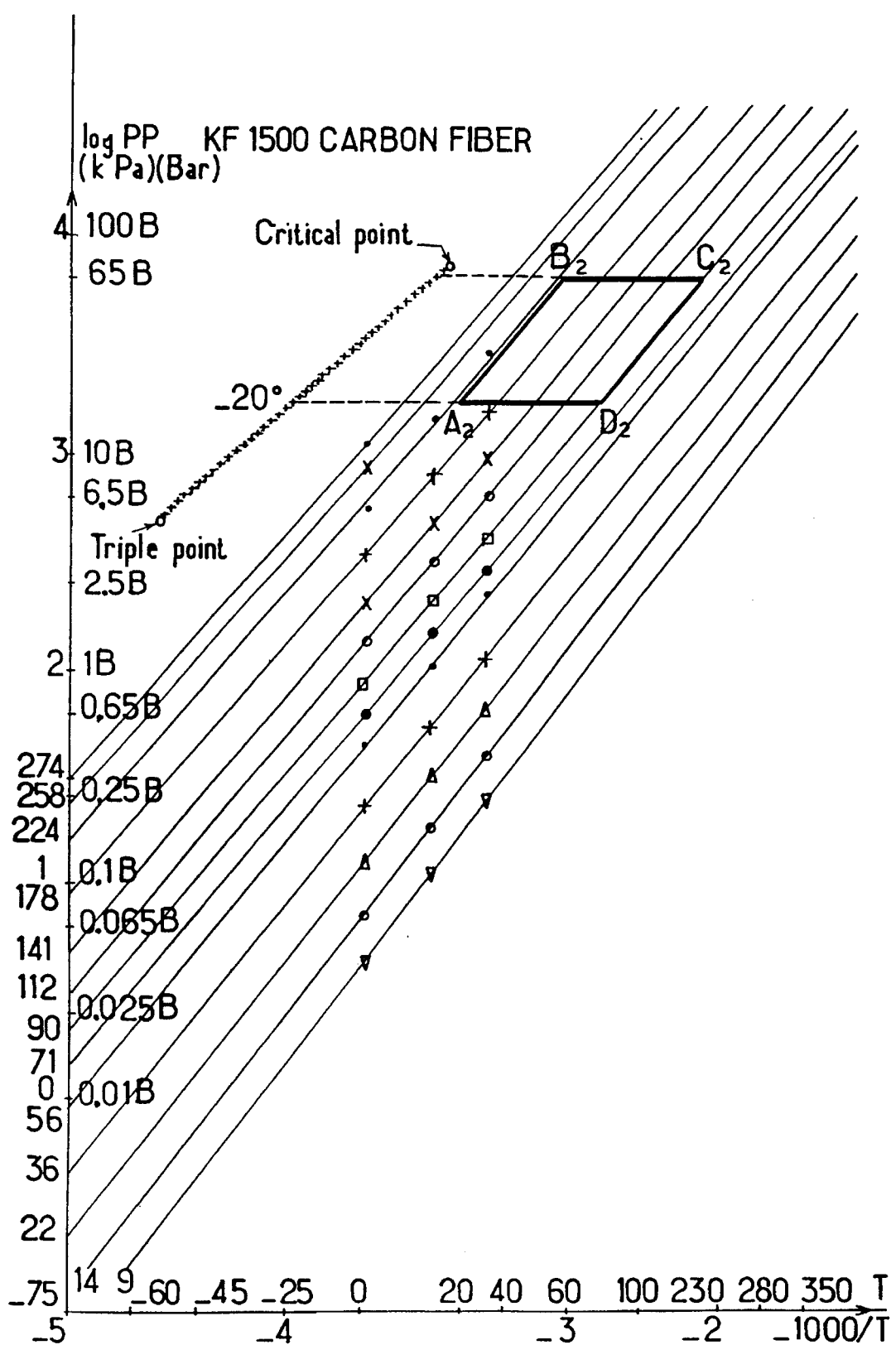
FIG.: 3

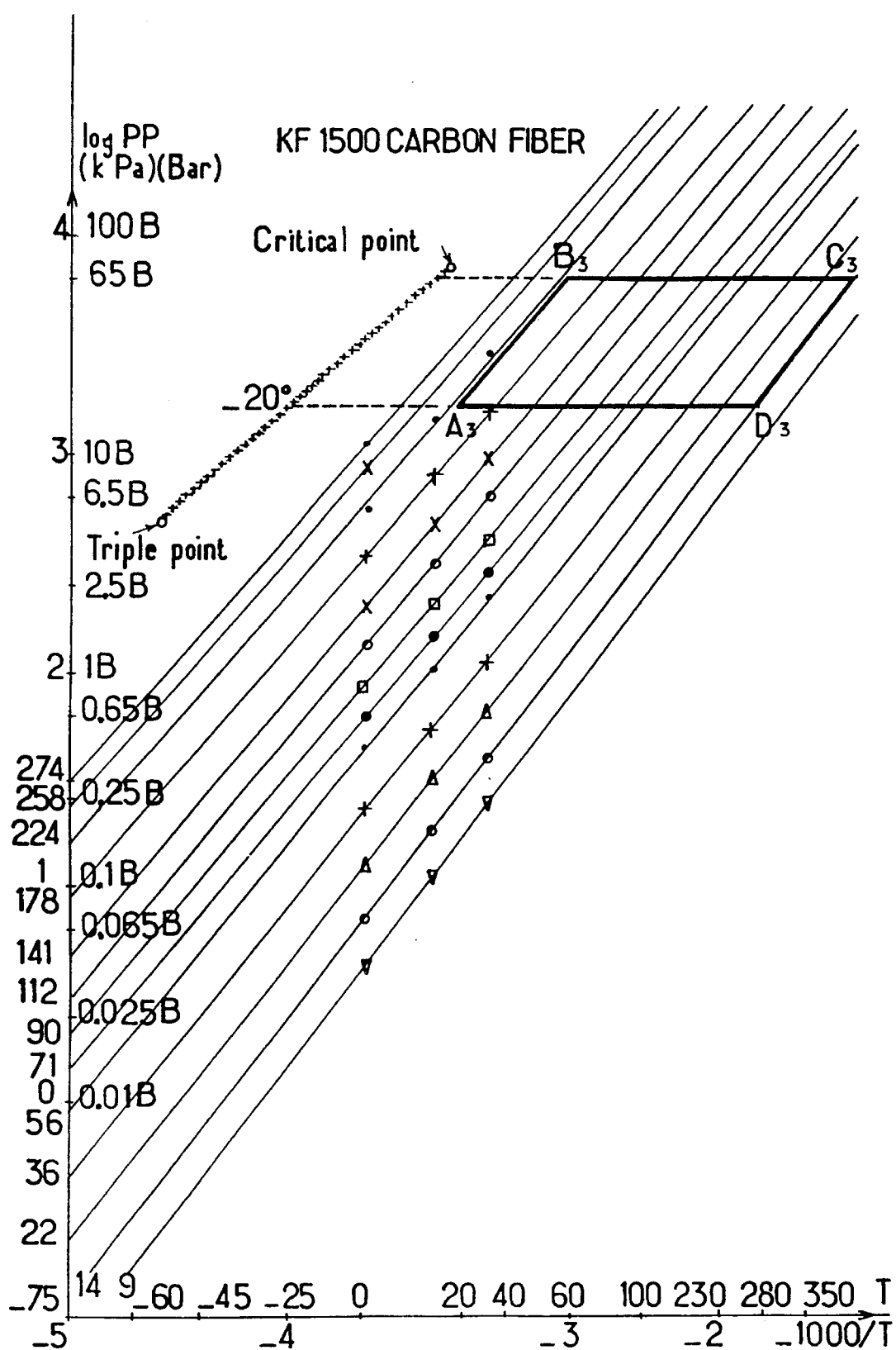
FIG.: 4

FIG.: 5
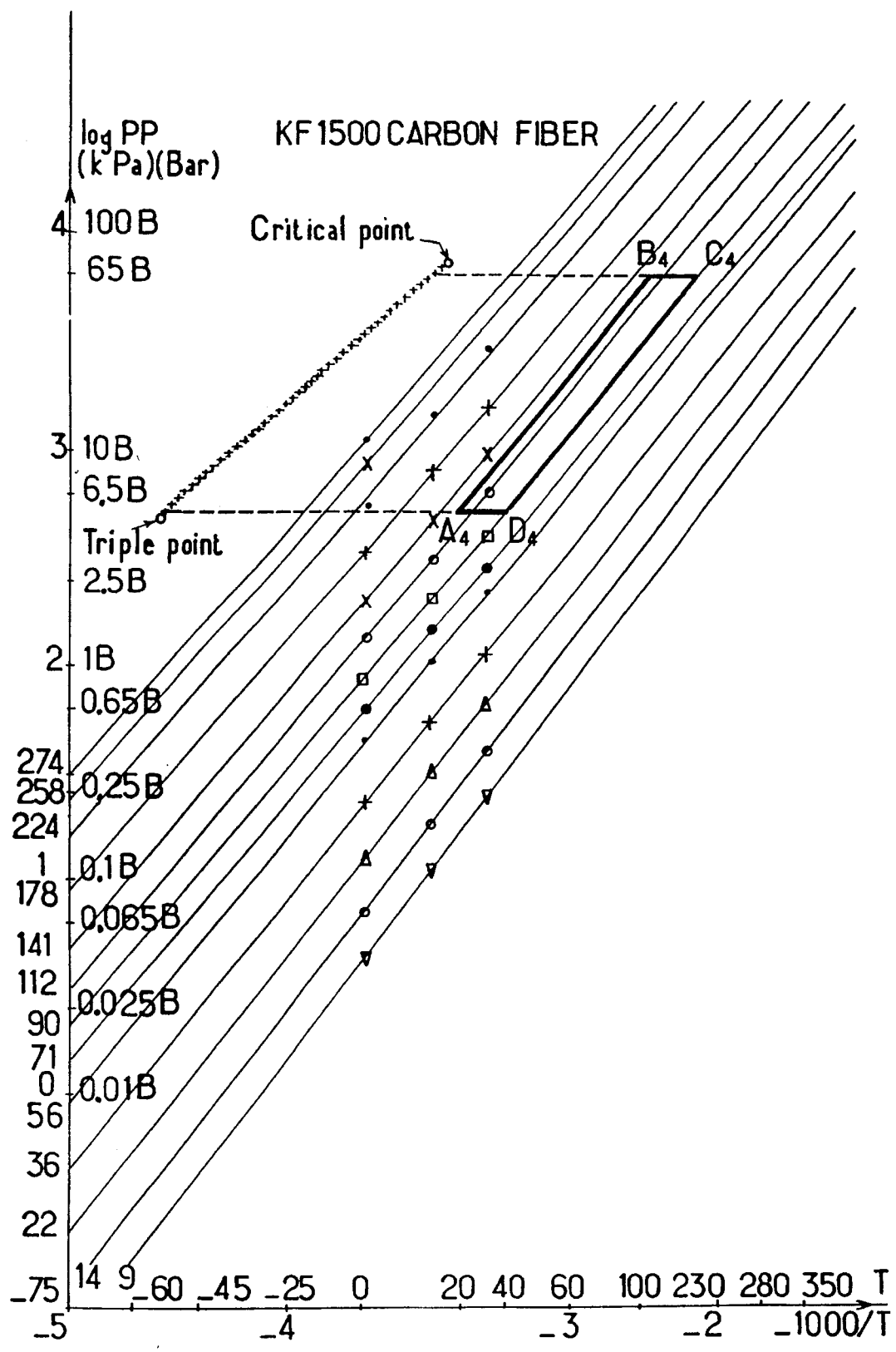

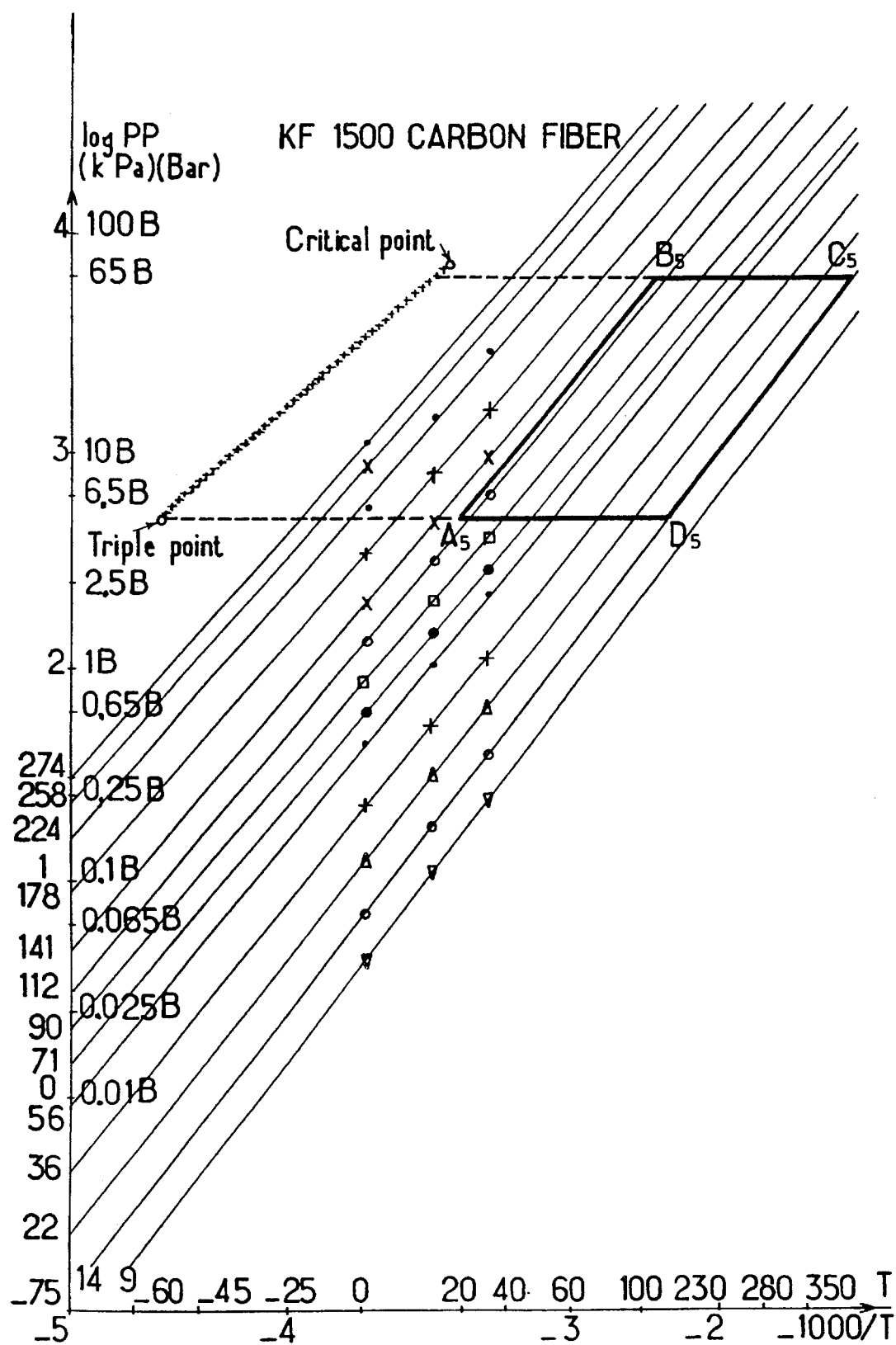
FIG.: 6

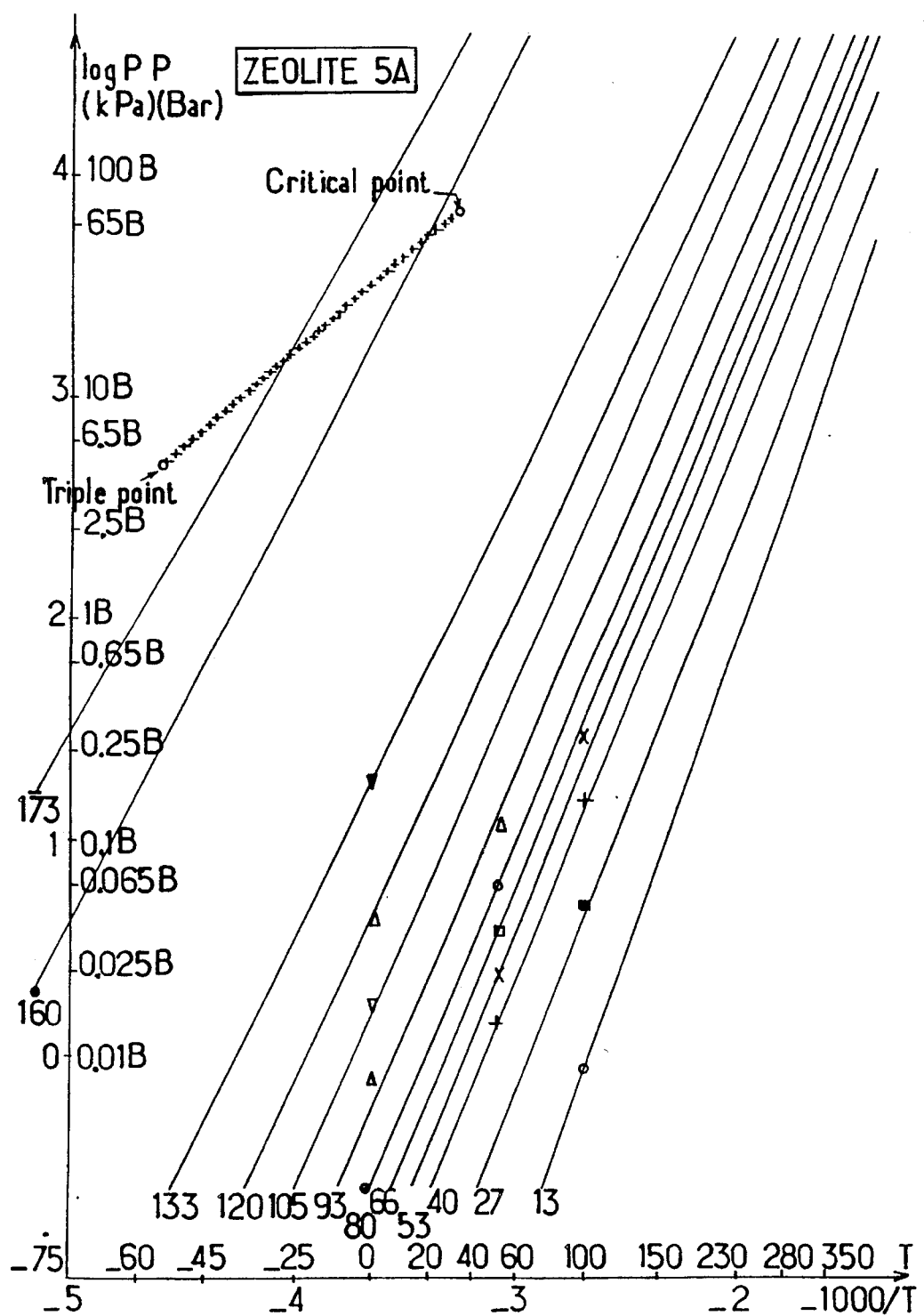
FIG.: 7

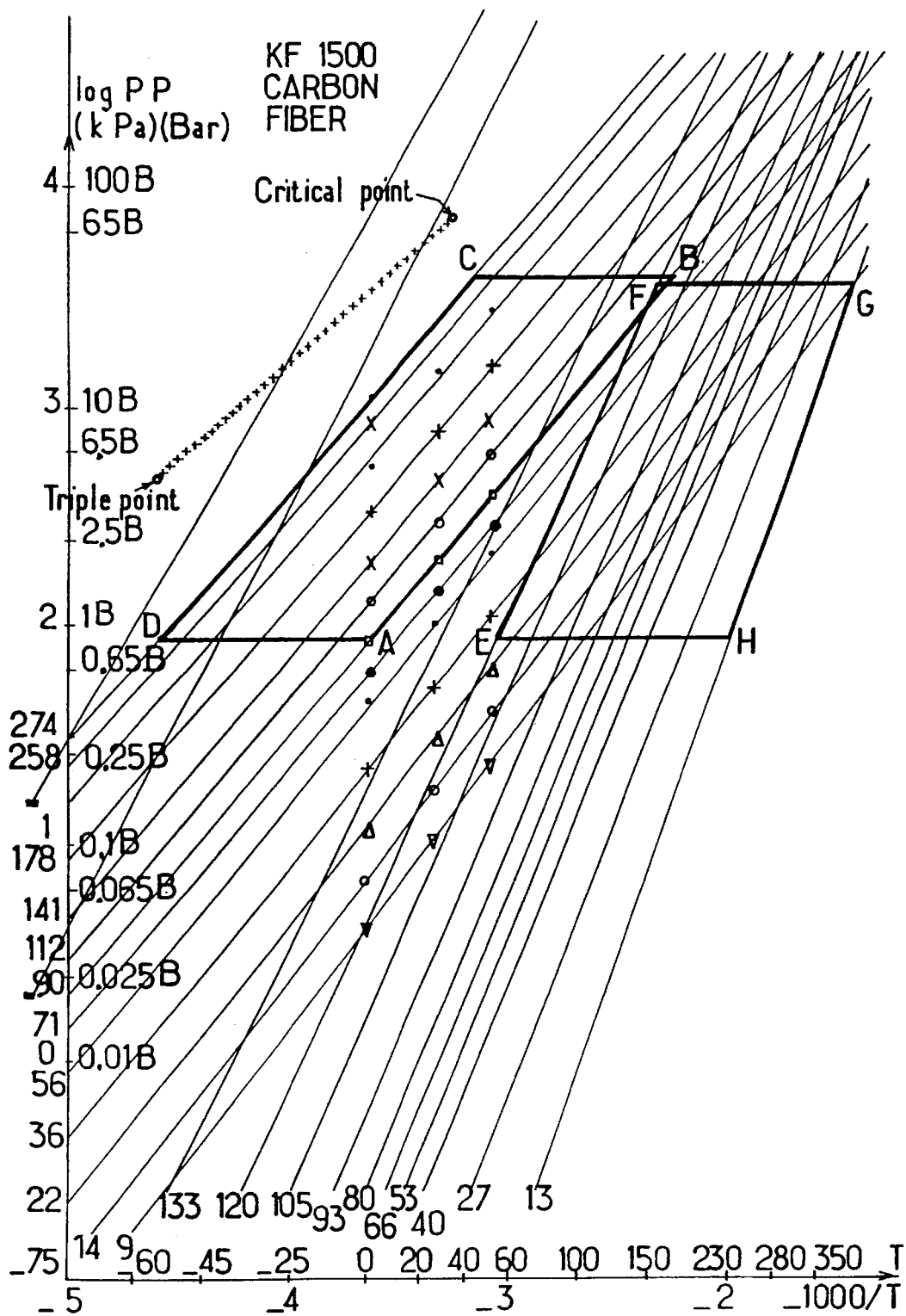
FIG.: 8

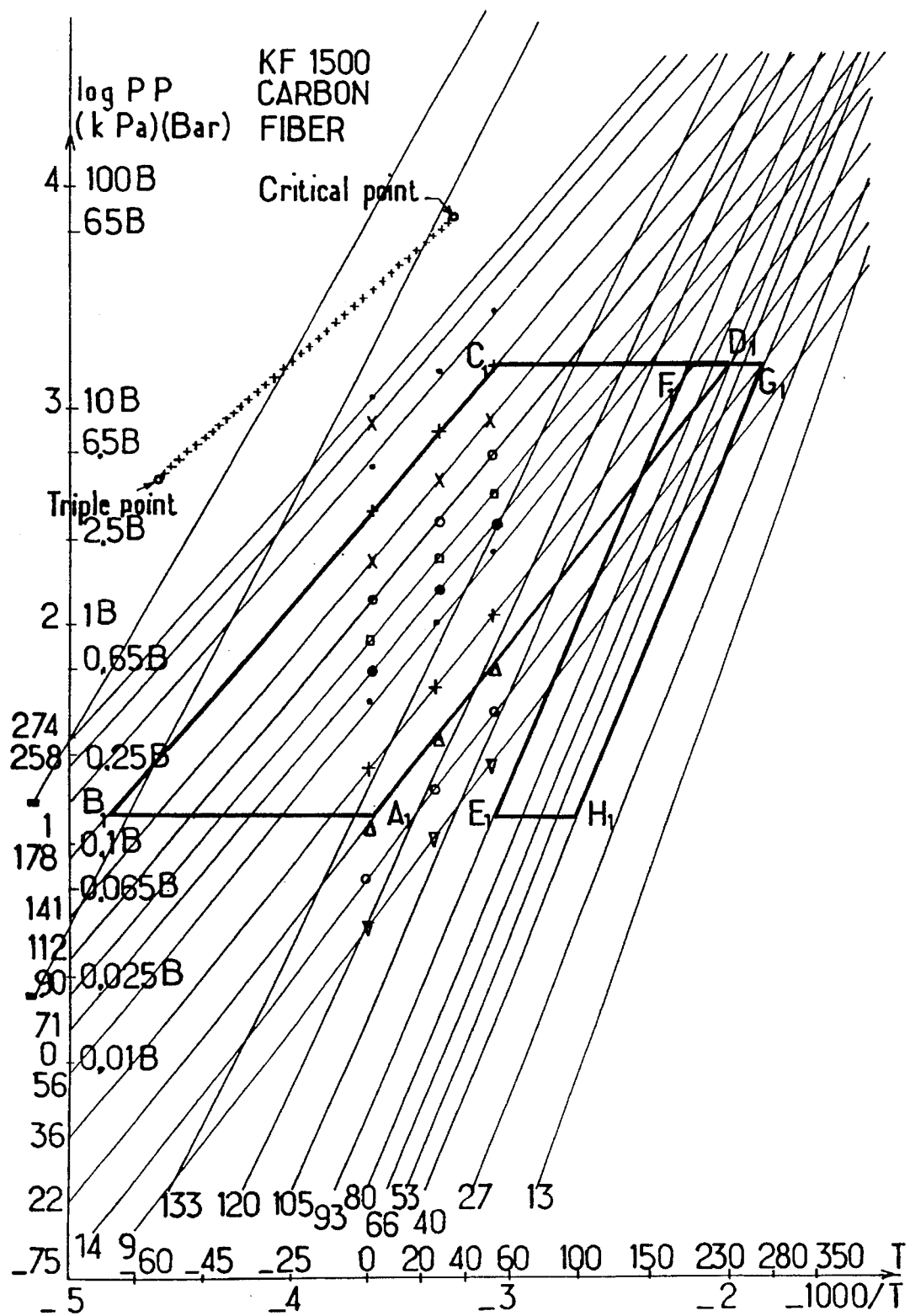
FIG.:9

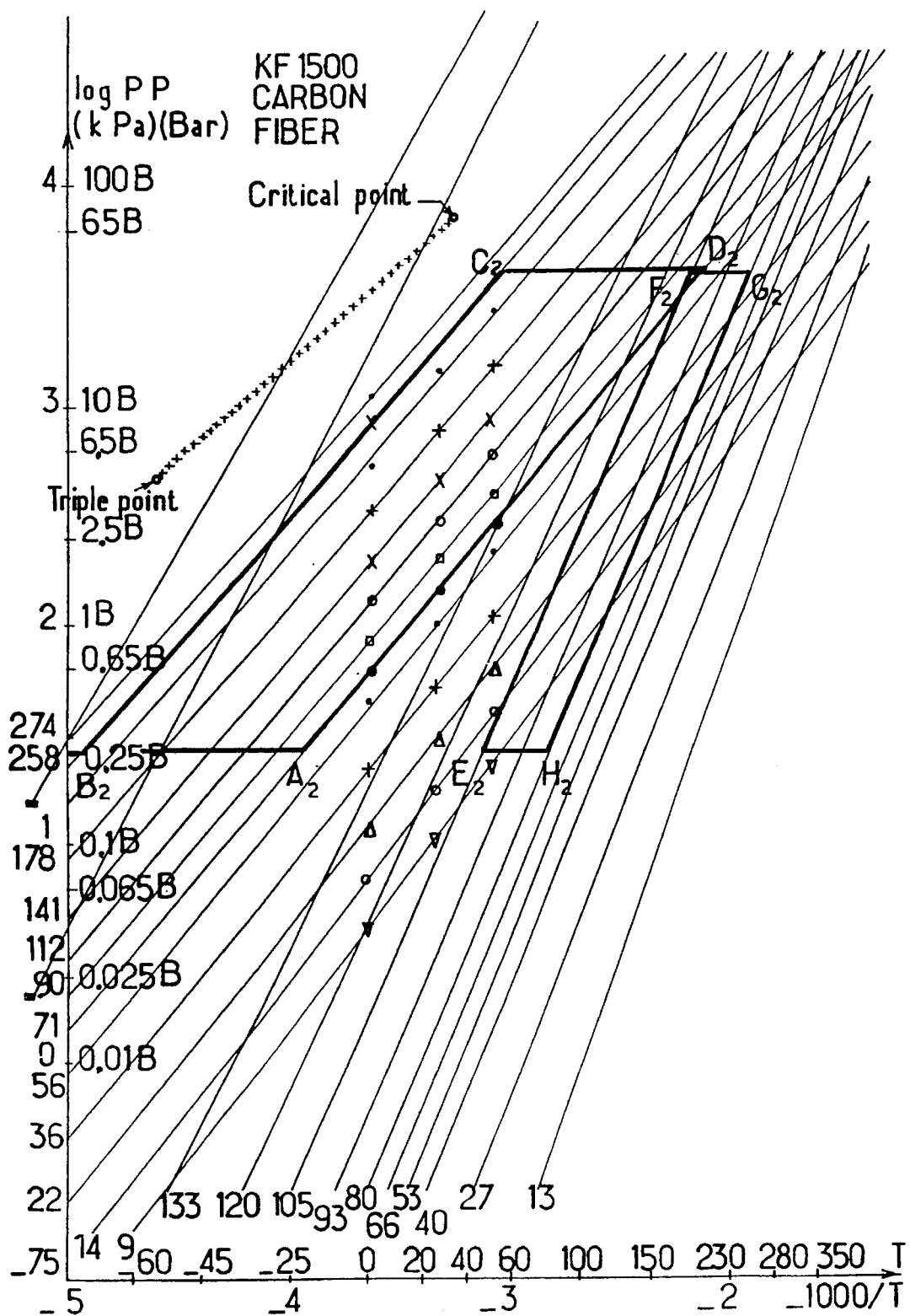
FIG.: 10

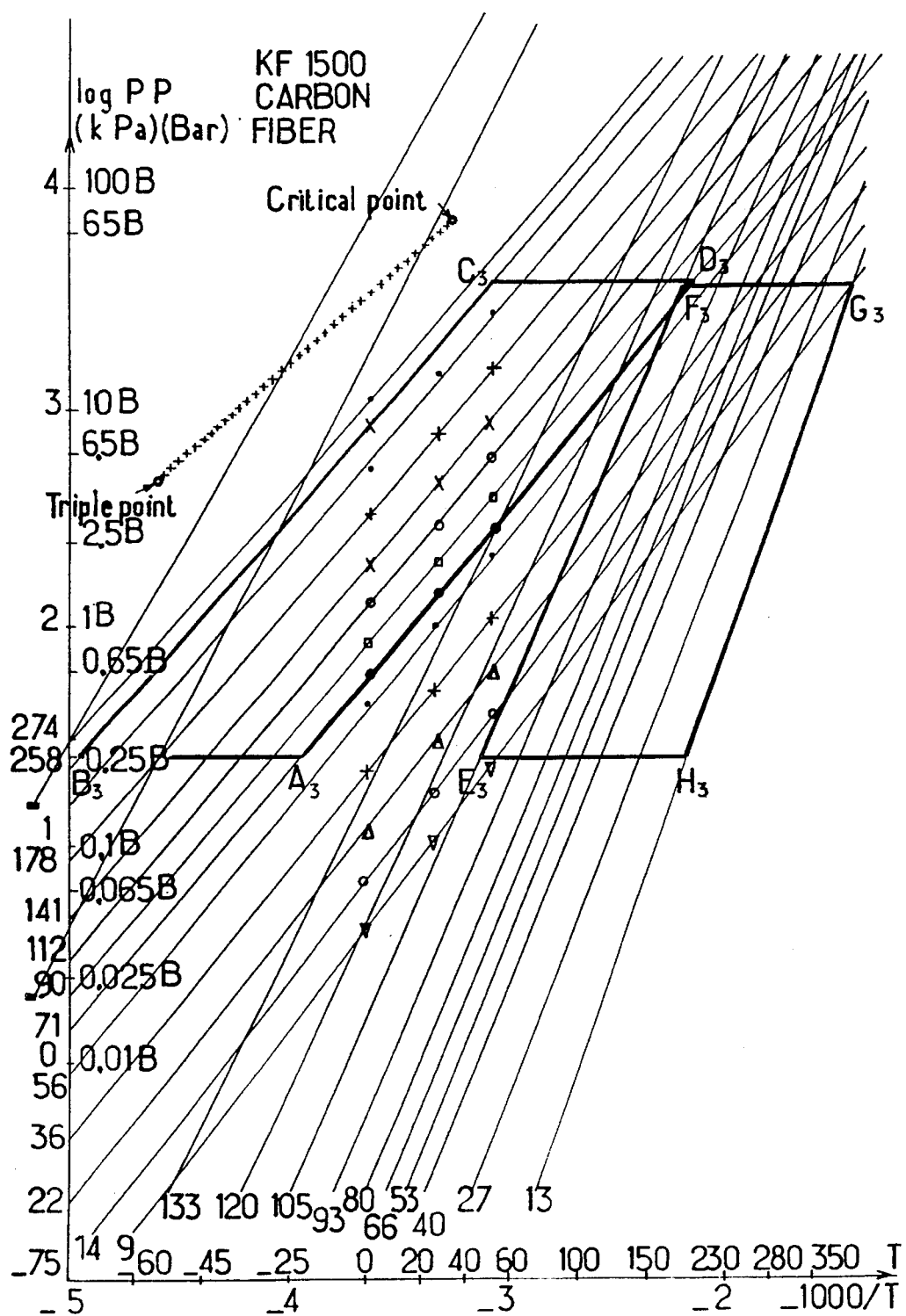
FIG.: 11

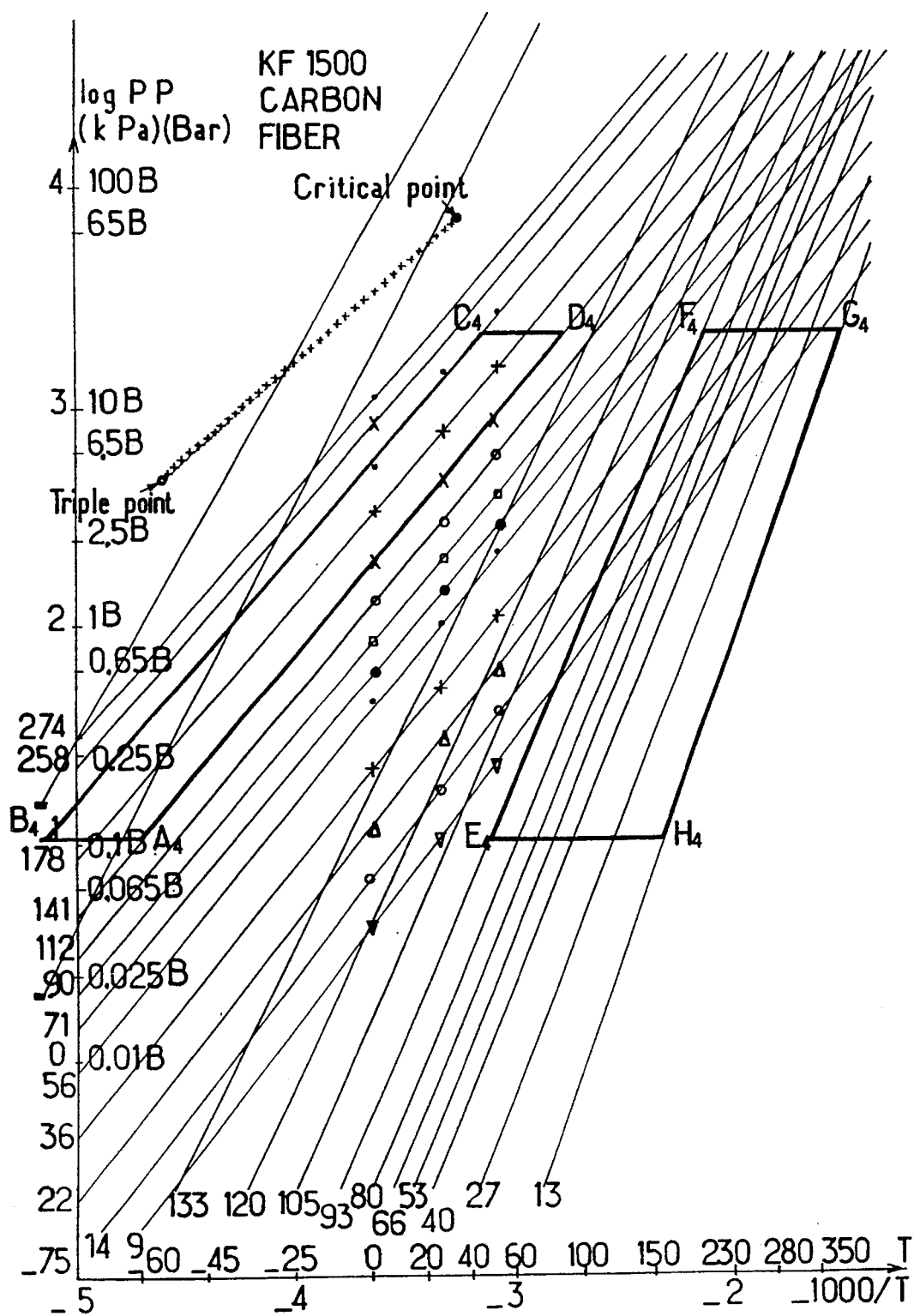
FIG.: 12

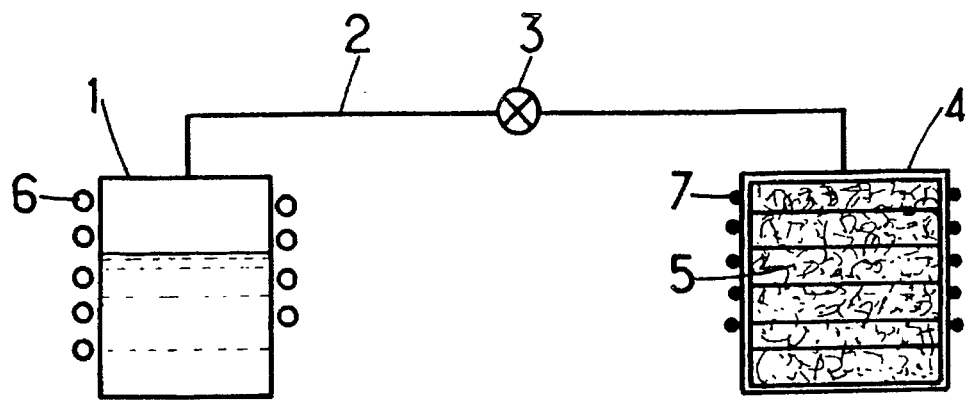
FIG.:13
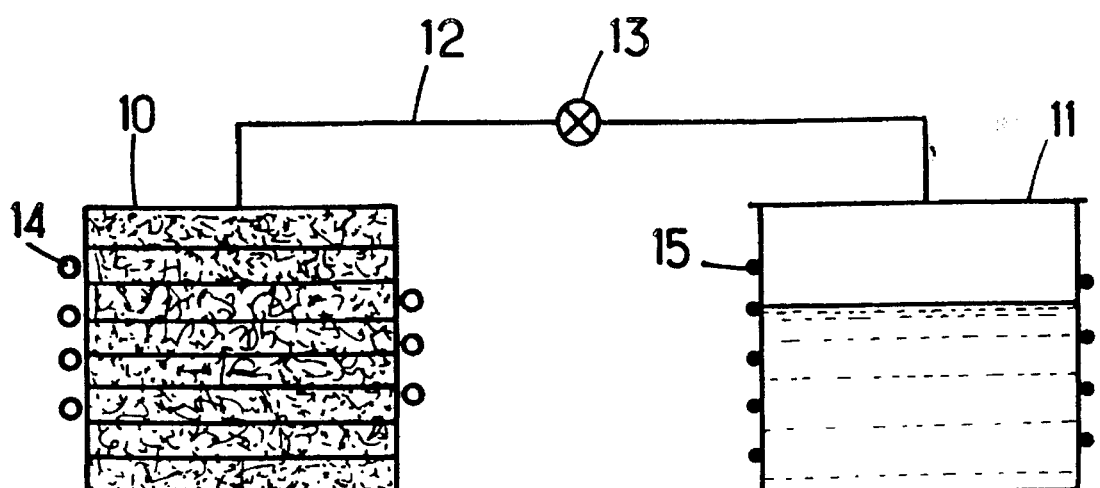
FIG.:14

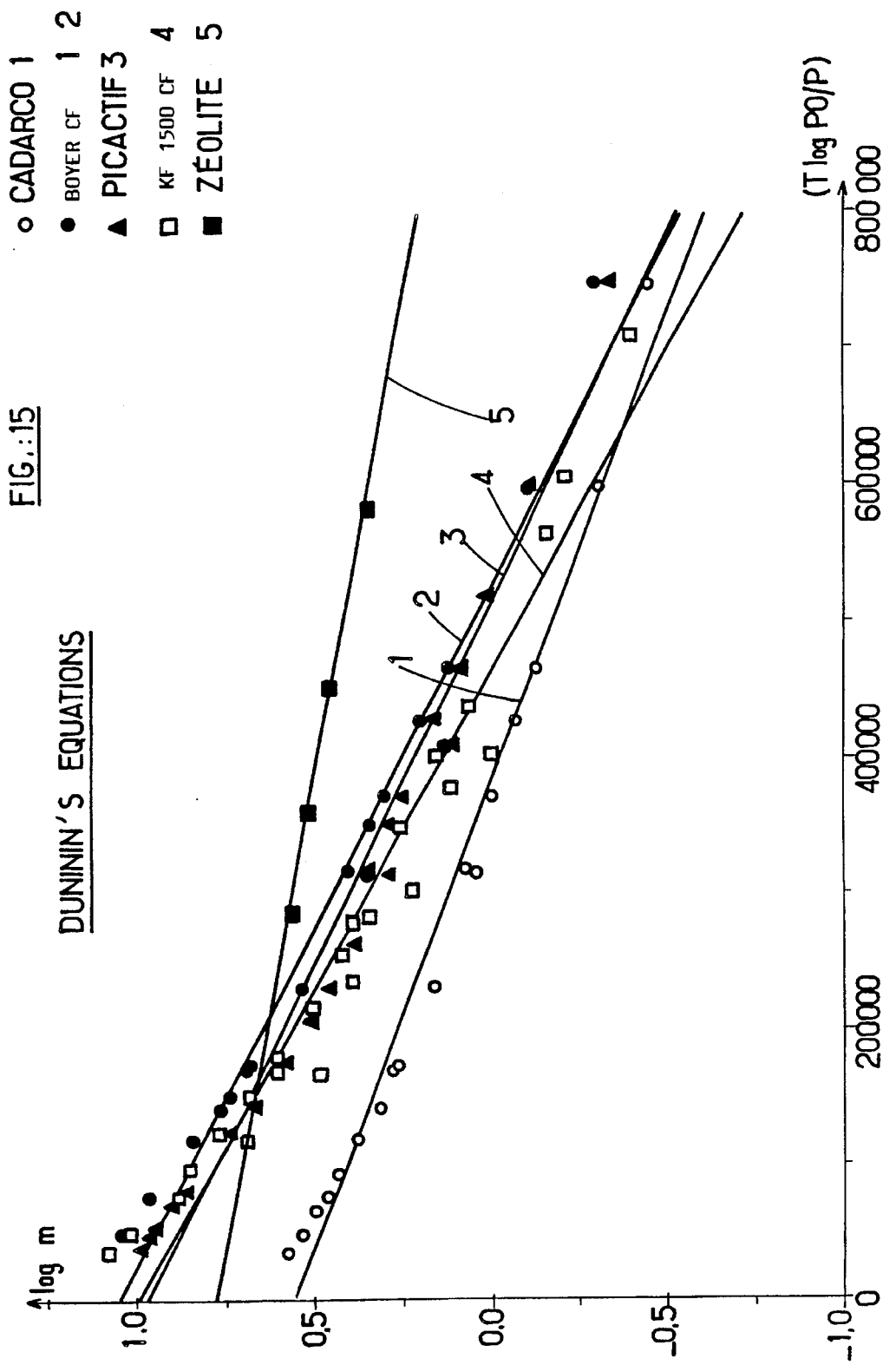

PRODUCTION OF COLD BY ADSORPTION/DESORPTION OF CARBON DIOXIDE

BACKGROUND OF THE INVENTION

The invention relates to the production of cold by adsorption/desorption of carbon dioxide with the use of activated carbon fibers or of active charcoal as adsorbent substance.

Messrs André Guillot, Alain Marty, Patrice Pelletier and Bernard Spinner, who belong to the C.N.R.S., have collaborated in the development of the present invention.

PRIOR ART

The use of carbon dioxide for the production of cold and/or of heat by an absorption cycle using a liquid solvent for carbon dioxide is known from FR-A-2,509,846 or from FR-A-2,519,416.

Furthermore, FR-A-2,526,926 has proposed a resorption process for producing cold and/or heat, according to which carbon dioxide is employed in an intermittent cycle using an adsorption or absorption of $CO_2$ by a liquid or a solid, and then a desorption of the $CO_2$. Zeolites (molecular sieves), clays, active charcoals or silica gel are proposed as adsorbent solid substance. However, only the use of a molecular sieve forms the subject matter of an example.

Finally, EP-A-0,523,849 describes a process for refrigeration by compression/decompression of $CO_2$, in a chamber containing a bed of adsorbent substance such as zeolite.

As far as the Applicant is aware, none of the abovementioned systems for producing cold has seen industrial development. This is explained by the insufficient efficiency of these systems.

However, it would be extremely advantageous to have at one's disposal systems for producing cold by adsorption/desorption employing carbon dioxide as working fluid, because the present systems for producing cold by adsorption or absorption employing water, methanol or ammonia as working fluid suffer from considerable disadvantages, namely:

of operating at low pressure, creating limitations in respect of the gas transfers into the adsorbent media (in the case of water);

of not being capable of producing negative cold (in the case of water);

of decomposing starting at 130° C. (in the case of methanol);

of exhibiting toxicity (in the case of methanol and ammonia).

Carbon dioxide, $CO_2$, in fact, would make it possible to obtain relief from these disadvantages because it makes the operation of systems at very low temperature theoretically possible (the triple point is at −57° C. and 5.1 bars), is not toxic and operates under a positive pressure. The critical point, however, is at 31° C., 73 bars.

There is therefore a need for systems that are more efficient than the known systems, for producing cold based on the use of $CO_2$.

The present invention is aimed at satisfying this need.

BRIEF SUMMARY OF THE INVENTION

More precisely, the invention relates to a process for the production of cold, comprising at least one stage of adsorption of carbon dioxide by an adsorbent solid substance and at least one stage of desorption of the carbon dioxide adsorbed in said adsorbent substance, in which process said adsorbent substance comprises activated carbon fibers or an active charcoal and has a specific surface area of at least 700 $m^2/g$ and an external specific surface area of at least 0.005 $m^2/g$.

The invention also relates to a device for the production of cold by adsorption/desorption of carbon dioxide, comprising at least one vessel packed with an adsorbent solid substance, in which device said adsorbent substance comprises activated carbon fibers or an active charcoal and has a specific surface area of at least 700 $m^2/g$ and an external specific surface area of at least 0.005 $m^2/g$.

"Activated carbon fibers" is intended to mean activated carbon fibers themselves and various fibrous products manufactured from these fibers, for example felts, sheets of paper incorporating activated carbon fibers, sheets formed from a mixture of activated carbon fibers and polymer fibers, structures of the honeycomb type which are manufactured from goffered or corrugated paper sheets incorporating activated carbon fibers, moulded components, and the like.

The activated carbon fibers are very fine, typically having a diameter of 5–15 μm.

The activated carbon fibers and the fibrous products in which they are incorporated have a very high specific surface area, typically from 700 to 2500 $m^2/g$ and an external specific surface area which is also very high, typically from 0.2 to 0.7 $m^2/g$, depending on the grades. It is preferred to employ fibers whose specific surface area is at least 1000 $m^2/g$.

These products are products that are commercially available. There may be mentioned, for example, the products sold under the name AD'ALL by the Japanese company Osaka Gas Co. Ltd, or under the names KF (or K-Filter) and AF by the Japanese company Toyobo Co. Ltd, Osaka, Japan. All these products are recommended as filter media for the purpose of purification or deodorization. Activated carbon fibers forming part of the AD'ALL products are manufactured from coal tar, whereas the carbon fibers of the KF products are manufactured from cellulose fibers by carbonization and activation.

Tests performed in order to determine the quantities of $CO_2$ that the activated carbon fibers are capable of adsorbing have shown the reproducibility of the adsorption/desorption over a wide range of temperature and pressure. The enthalpy of adsorption/desorption is of the order of 25 kJ per mole of adsorbed $CO_2$.

An active charcoal may also be employed instead of the activated carbon fibers, or as a mixture therewith, provided it has a specific surface area of at least 700 $m^2/g$, preferably of at least 1000 $m^2/g$, and an external specific surface area of at least 0.005 $m^2/g$, preferably of at least 0.02 $m^2/g$.

Such an active charcoal is commercially available under the trade name Picactif, reference TA60 or TA90, from the Pica company, 92309 Levallois, France. It has a specific surface area of more than 1000 $m^2/g$ and an external specific surface area of approximately 0.02 $m^2/g$ and is in the form of granules from approximately 1 to 4 mm in size.

The invention is absolutely not bound to any particular process for the production of cold and may be implemented in very varied machines.

For example, the process of the invention may be implemented in a single-effect machine, in a machine of the type described in FR-A-2,615,601, in a resorption machine, for example of the kind described in FR-A-2,526,926 or else in a refrigeration machine of the kind described in EP-A-0, 523,849.

The invention lends itself particularly well to the production of a resorption heat transformer making use of two different adsorbent solid substances contained, respectively, in two interconnectable chambers or vessels, one of these adsorbent solid substances being in accordance with the invention, and the other adsorbent solid substance being chosen so that, on a Clapeyron diagram, the isosteric adsorption/desorption cycle of the adsorbent substance in accordance with the invention is on the left-hand side of the temperature well (15° to 35° C., depending on whether water or air is employed as heat exchange fluid) and the isosteric adsorption/desorption cycle of the other adsorbent substance is on the right- hand side of said temperature well, as illustrated, for example, by FIGS. 8 to 12 below.

An example of said other adsorbent substance is a zeolite.

The invention lends itself well to the production of cold ranging approximately from 0° to −60° C., depending on the operating conditions that are chosen.

The description which is to follow, given with reference to the attached drawings, will facilitate understanding of the invention.

BRIEF DESCRIPTION OF THE DRAWINGS

FIGS. 1 to 6 are Clapeyron diagrams containing isosteres for activated carbon fiber and illustrating various operating cycles of single-effect machines for producing cold;

FIG. 7 is a Clapeyron diagram containing isosteres for a zeolite;

FIGS. 8 to 12 are Clapeyron diagrams containing isosteres for activated carbon fiber and for zeolite and illustrating various operating cycles for resorption machines for producing cold;

FIG. 13 is a diagrammatic view illustrating a single-effect machine for producing cold;

FIG. 14 is a diagrammatic view illustrating a resorption machine for producing cold; and FIG. 15 is a diagram showing the Dubinin function for various adsorbent agents.

Tests have been performed to determine the volumes of $CO_2$ that activated carbon fibers, in this case an activated carbon fiber felt sold under the name KF 1500 by the Japanese company Toyobo Co. Ltd., can adsorb. According to the supplier's specifications, the felt offers a specific surface area of 1400–1450 $m^2/g$ and weighs 180–220 $g/m^2$. Its apparent density is 0.045 $g/cm^3$. Adsorption/desorption operations were repeated over a wide range of temperatures and pressures, and the isosteres, that is to say the equilibrium lines, at a given volume (in $cm^3$) of $CO_2$ adsorbed per gram of fibrous felt, were plotted on the Clapeyron diagram.

FIGS. 1 to 6 are Clapeyron diagrams reproducing the system of isosteres obtained. The straight line joining the triple point and the critical point of $CO_2$ has also been shown in these diagrams and in the following ones (as a line made up of a series of crosses).

Each of the quadrilaterals ABCD and $A_nB_nC_nD_n$ where $_n=1$ to 5 represents the cycle of the adsorbent substance (activated carbon fibers) for a set of given operating conditions for single-effect systems.

The system of isosteres for a LINDE 5A zeolite has also been determined in a similar manner (FIG. 7).

In the diagrams of FIGS. 8 to 12, in which the isosteres both for activated carbon fibers and for zeolite 5A have been plotted, each of the quadrilaterals $A_nB_nC_nD_n$ and $E_nF_nG_nH_n$ where $_n=1$ to 4 represents the cycle of one of the adsorbent substances (activated carbon fibers and zeolite) for a set of given operating conditions.

In all the diagrams the values written in the margin, opposite each isostere, represent $cm^3$ of $CO_2/g$ of adsorbent substance.

The enthalpy of adsorption/desorption is 25 kJ per mole of $CO_2$ adsorbed.

Depending on the type of machine used, the temperature of the well (points A of the quadrilaterals) which may be, for example, coolant water or external air (taken at 35° C. in the examples below), the high temperature available (points D of the quadrilaterals) and the temperature of the cold to be produced, the adsorption capacity will vary.

Thus, with a single-effect machine (FIGS. 1–6), with a well temperature of 35° C. (external air):

production of cold at 0° C.; the isostere system is ABDC; the field of the isosteres employed is 274-90, that is 184 $cm^3/g$ if a high temperature Th of 200° C. is adopted; if this temperature is 400° C., the system $A_1B_1C_1D_1$ permits an adsorption capacity of 274-14, that is 260 $cm^3/g$;

production of cold at −20° C., the isostere system is $A_2B_2C_2D_2$ (Th=200° C.) or $A_3B_3C_3D_3$ (Th=400° C.), permitting adsorption capacities of 130 $cm^3/g$ and 206 $cm^3/g$ respectively;

production of cold at −50° C.; the isostere system is $A_4B_4C_4D_4$ (Th=200° C.) or $A_5B_5C_5D_5$ (Th=400° C.) with the respective adsorption capacities of 35 $cm^3/g$ and 110 $cm^3/g$).

The use of KF 1500 fibers makes it possible to produce a quantity of cold that is markedly greater than that which the use of a zeolite 5A would make it possible to produce in comparable operating conditions. For example, it is possible to calculate (from the isosteres of FIGS. 1 and 7) that, for a production of cold at −40° C. (10-bar line), the $CO_2$ adsorption capacity of the KF 1500 fiber is 215 $cm^3/g$ (isostere at 224 $cm^3/g$-isostere at 9 $cm^3/g$). The isostere at 9 $cm^3/g$ is chosen in so far as it is situated to the right of 30° C. in order to permit the removal of the heat of adsorption. The adsorption capacity of the zeolite 54 is only 132 $cm^3/g$ (isostere at 145 $cm^3/g$ (approximately)-isostere at 13 $cm^3/g$). KF 1500 fiber therefore makes it possible to produce 1.6 times (215/132) more cold at the evaporator.

With a resorption machine (FIGS. 8–12):

production of cold at 0° C.; the isostere system of the KF 1500 adsorbent producing the cold is ABCD, and that at high temperature with zeolite 5A is EFGH (Th=400° C.) or, alternatively, $A_1B_1C_1D_1$ and $E_1F_1G_1H_1$ (Th=250° C.). The $CO_2$ adsorption capacities employed are, respectively: 184 $cm^3/g$ on KF 1500 and 107 $cm^3/g$ on Z 5A, on the one hand, and 156 $cm^3/g$ on KF 1500 and 53 $cm^3/g$ on Z 5A, on the other hand;

production of cold at −20° C.: the systems are $A_2B_2C_2D_2$ and $E_2F_2G_2H_2$ (Th=250° C.) or, alternatively, $A_3B_3C_3D_3$ and $E_3F_3G_3H_3$ (Th=400° C.). The adsorption capacities employed are, respectively: 187 $cm^3/g$ on KF 1500 and 26 $cm^3/g$ on Z 5A; and 187 $cm^3/g$ on KF 1500 and 93 $cm^3/g$ on Z 5A;

production of cold at −60° C., the KF 1500 carbon fiber being coupled as cold adsorbent with a zeolite 5A as adsorbent at high temperature; the regions are $A_4B_4C_4D_4$ with a capacity of 83 $cm^3/g$ and $E_4F_4G_4H_4$ with a capacity of 77 $cm^3/g$, requiring a high temperature of 390° C.

A single-effect machine is shown diagrammatically in FIG. 13. This machine comprises a storage vessel 1 with liquid $CO_2$, connected by a conduit 2 fitted with a valve 3 to an adsorber 4 containing activated carbon fibers 5. A heat exchanger 6 is provided on the storage vessel 1 and heating means, such as an electrical resistance 7, are used in combination with the adsorber 4. Such a machine can be used for the non-continuous production of cold (storage effect).

To produce cold, for example at 0° C., the storage vessel 1 and the adsorber 4 are brought into communication by opening the valve 3. The internal pressure applied is 34.5 bars (FIG. 1). Throughout this stage, the temperature in the adsorber goes from D (150° C.) to A (35° C.). The cold generated is recovered from the storage vessel by the heat exchanger 6.

To regenerate the system, the communication between 1 and 4 is closed and the temperature of 4 is allowed to rise again from A (35° C.) to B (65° C.) (isosteric rise, that is to say along the isostere corresponding to an adsorbed $CO_2$ content of 274 cm³/g of carbon fibers), and then the communication between 1 and 4 is reopened and 4 is heated to 200° C. by means of the resistance heater 7 to desorb the adsorbed $CO_2$ (transition from point B to point C). $CO_2$ condenses in 1 at 30° C. (P=60 bars). Finally, is allowed to cool from 200° to 150° C. (transition from point C to point D) after the communication between 1 and 4 has been closed again. The system is then ready for a new stage of production of cold.

Such a machine could, of course, also be made to operate in different conditions, for example as shown diagrammatically by the quadrilaterals $A_nB_nC_nD_n$ in FIGS. 2 to 6.

A resorption machine for producing cold, as illustrated diagrammatically in FIG. 14, can also be employed for implementing the process of the invention. This machine comprises two vessels 10 and 11 packed with activated carbon fibers and zeolite 5A respectively and connected by a conduit 12 fitted with a valve 13. A heat exchanger 14 is provided around the vessel 10 and a resistance heater 15 is arranged around the vessel 11.

The operation takes place by following the conditions outlined in the diagram of FIG. 8, assuming that the carbon fibers packing the vessel 10 are initially charged with adsorbed $CO_2$.

a) the two vessels are brought into communication, the temperature of the vessel 10 packed with carbon fibers changes from −50° C. (point D) to 0° C. (point A) while the $CO_2$ is desorbed and moves into the vessel 11 where it is adsorbed by the zeolite which changes from 190° C. (point H) to 45° C. (point E);

b) the connection between the vessels is interrupted by closing the valve. The vessel 10 is allowed to warm up again from 0° C. (point A) to 30° C. (point B) in the ambient atmosphere, while the vessel 11 is heated from 45° C. (point E) to 70° C. (point F) by means of the resistance 15;

c) communication between the vessels is established. The vessel 11 is heated from 70° C. (point F) to 200° C. (point G) by means of the resistance to desorb $CO_2$ from the zeolite and to adsorb it in the activated carbon fiber of the vessel 10, which changes from 30° C. (point B) to −40° C. (point C);

d) heating of the vessel 11 containing zeolite is stopped and it cools from 200° C. (point G) to 190° C.. As this is done the pressure drops in both vessels from 2 bars to 0.9 bar and the carbon fiber in the vessel 10 changes from −40° C. (point C) to −50° C. (point D). The cold produced can be removed by the exchanger 13.

The cycle can then be repeated.

FIG. 15 is a diagram representing the Dubinin function for various solid adsorbent agents.

The Dubinin function is:

$$\log m = T \log P_o/P$$

where m=$CO_2$ adsorption capacity of the adsorbent agent, in millimol/gram,

Po=saturated vapor pressure of $CO_2$ at temperature T,

T and P=temperature and pressure which are applied, and gives a good illustration of the quality of the adsorbent agent.

In the diagram of FIG. 15 it can be seen that the KF 1500 (Toyobo) activated carbon fiber, the Osaka Gas activated carbon fiber and the Picactif (Pica) active carbon have high potential for adsorbing $CO_2$ (log m equal to approximately 1) and that the isostere regions are closely related. The Darco active charcoal (produced by the Darco company (U.S.A.) and available from the Aldrich-France company) has a much lower capacity, while zeolite 5A, though better than the Darco charcoal in so far as the adsorption capacity is concerned, exhibits the disadvantage that its stability region is situated at high temperatures.

It is obvious that the embodiments described are merely examples and that they could be modified, especially by substitution of technical equivalents, without departing thereby from the scope of the invention.

What is claimed is:

1. A process for the production of cold, comprising at least one stage of adsorption of carbon dioxide by an adsorbent solid substance and at least one stage of desorption of the carbon dioxide adsorbed in said adsorbent substance, in which process said adsorbent substance comprises activated carbon fibers or an active charcoal and has a specific surface area of at least 700 m²/g and an external specific surface area of at least 0.005 m²/g.

2. The process as claimed in claim 1, wherein the activated carbon fibers have a specific surface area of at least 1000 m²/g and an external specific surface area of at least 0.2 m²/g.

3. A device for the production of cold by adsorption/desorption of carbon dioxide comprising at least one vessel packed with an adsorbent solid substance, in which device said adsorbent substance comprises activated carbon fibers or active charcoal and has a specific surface area of at least 700 m²/g and an external surface area of at least 0.005 m²/g.

4. The device as claimed in claim 3, wherein the activated carbon fibers have a specific surface area of at least 1000 m²/g and an external specific surface area of at least 0.2 m²/g.

5. A device for the production of cold by adsorption/desorption of carbon dioxide comprising at least one vessel packed with an adsorbent solid substance in which device said adsorbent substance comprises activated carbon fibers or active charcoal and has a specific surface area of at least 700 m²/g and an external surface area of at least 0.005 m²/g, wherein further the device is of the resorption type and comprises at least two interconnectable vessels packed with different adsorbent solid substances, one of these adsorbent substances being activated carbon fibers or an active charcoal and having a specific surface area of at least 700 m²/g and an external specific surface area of at least 0.005 m²/g, and being subjected, on a Clapeyron diagram, to an adsorption/desorption cycle situated on the left-hand side of the temperature well employed, and the other adsorbent substance being chosen so that its adsorption/desorption cycle is situated on the right-hand side of said well.

6. The device as claimed in claim 5, wherein the other adsorbent substance is a zeolite.

7. A device for the production of cold comprising a vessel containing liquid $CO_2$ and provided with heat-exchanging means, an adsorber provided with heating means and packed with activated carbon fibers or active charcoal having a specific surface area of at least 700 $m^2/g$ and a specific external area of at least 0.005 $m^2/g$, and means for connecting or disconnecting said vessel and said adsorber.

8. A device as claimed in claim 7, wherein the activated carbon fibers have a specific surface area of at least 1000 $m^2/g$ and an external specific surface area of at least 0.2 $m^2/g$.

* * * * *